United States Patent [19]

Trumbauer

[11] E Re. 31,488

[45] Reissued Jan. 10, 1984

[54] CASTING METHODS WITH COMPOSITE MOLDED CORE ASSEMBLY

[75] Inventor: David V. Trumbauer, Bremer, Iowa

[73] Assignee: Deere & Company, Moline, Ill.

[21] Appl. No.: 155,194

[22] Filed: Jun. 2, 1980

Related U.S. Patent Documents

Reissue of:

[64] Patent No.: 4,093,018
Issued: Jun. 6, 1978
Appl. No.: 733,958
Filed: Oct. 19, 1976

[51] Int. Cl.[3] ..... B22C 9/04

[52] U.S. Cl. ..... 164/32; 164/34; 164/246; 164/369

[58] Field of Search ..... 164/34, 137, 246, 361; 264/221, 317, DIG. 44

[56] References Cited

U.S. PATENT DOCUMENTS 3,339,620 9/1967 Krzyzanowski et al. .
3,367,393 2/1968 Lenahan et al. ..... 164/361 X
3,374,827 3/1968 Schebler ..... 164/137
3,496,989 2/1970 Paoli ..... 164/137 X
3,498,360 3/1970 Wittmoser et al. ..... 164/34 X
3,572,421 3/1971 Mezey et al. .
3,598,167 8/1971 Snyderman ..... 164/34
3,620,286 11/1971 Hofmann et al. .
3,945,429 3/1976 Wahlqvist .

*Primary Examiner*—R. L. Spruill
*Assistant Examiner*—K. Y. Lin
*Attorney, Agent, or Firm*—Burns, Doane, Swecker & Mathis

[57] ABSTRACT

A core assembly is formed by fabricating a first core, molding a destructible plastic layer around the first core, and molding a second core around the plastic layer. The plastic layer is interlocked [wth] *with* an irregular outer surface of the first core, and the second core is interlocked with an irregular outer surface of the plastic layer. The core assembly can be used for casting engine cylinder heads to eliminate the need for gluing cores together and the accompanying formation of fins within fluid conducting passages.

16 Claims, 5 Drawing Figures

CASTING METHODS WITH COMPOSITE MOLDED CORE ASSEMBLY

Matter enclosed in heavy brackets [ ] appears in the original patent but forms no part of this reissue specification; matter printed in italics indicates the additions made by reissue.

BACKGROUND AND OBJECTS OF THE INVENTION

The present invention relates to foundry, tooling, processes and methods and more particularly to a core assembly for use in casting operations.

It is known to form castings such as engine cylinder heads by various foundry techniques in which cores of different shapes are placed within a mold to form voids, such as water jacket passages and gas ports for example. In the past, this has required the forming, handling and assembling of numerous cores. A comparatively large number of cores and considerable assembly labor is used in the fabrication of assemblies of this type.

Moreover, conventional core arrangements may require subassembly and pasting or gluing of one or more of the cores together. Such core assemblies are subject to some breakage due to handling, and whenever cores are glued together there are numerous instances in which molten metal flows between the cores and forms fins. When these fins protrude into water jacket passages, they must be removed as they would tend to restrict circulation and interfere with the proper operation of the engine.

Also, in commercial foundries, it is not uncommon for gluing to be performed in such a manner that relatively large amounts of glue remain in hidden or inaccessible areas of the assembled cores. This excess glue acts much as a core would, leaving a void and causing surface imperfections or holes which can necessitate scrapping of the cast piece.

Further disadvantages of conventional core arrangement may include the need for using a large base or positioning core to hold the water jacket cores and port cores in place during core assembly and during pouring.

Another problem associated with conventional cylinder head coring assemblies lies in the need to design the port walls with relatively thick sections in order to allow for proper assembly of the port cores. These thicker than necessary sections have an adverse effect on efficient operation and cooling of the cylinder head.

In certain types of core arrangements, some of the above described problems might be alleviated to a degree by reducing the number of cores in a manner described in U.S. Pat. Nos. 2,820,267 and 2,858,587, issued to Leach on Jan. 21, 1958 and Nov. 4, 1958, respectively. These patents disclose core arrangements for a cylinder head casting in which a number of core-assemblies are combined into a fewer number of cores. The resulting cores are each considerably more complex to form, requiring greater expenditures of time and expense. In addition, the core assemblies disclosed in these patents require the water jacket cores and port cores to be positioned on the green sand in a drag half of a mold in order to maintain their proper spatial relationship. This, in turn, requires the formation of recesses, ridges and projections in the green sand of the mold of sufficient precision to provide the required alignment. Further, the water jacket and port cores cannot be assembled accurately in the absence of the drag half of the mold. This type of assembly is useful only when the core subassemblies can be combined and is commercially inapplicable to many types of core assemblies in which intermediate cores can only be located within the core assembly before certain other outer cores are positioned in place.

The search has thus continued for a commercially acceptable method of providing a core arrangement which eliminates gluing of cores and its resulting disadvantages and which provides for fewer core components.

It is, therefore, an object of the present invention to provide novel methods and tooling for minimizing or eliminating problems of the sort dicussed above.

It is another object of the invention to provide a novel core assembly and novel methods for fabrication thereof.

It is another object of the present invention to minimize the formation of fins and surface imperfections in casting operations.

It is another object of the invention to eliminate the need for a positioning core in casting operations.

It is a further object of the invention to improve the cooling characteristics of cast cylinder heads.

THE DRAWING

In describing the invention, reference will be made to a preferred embodiment shown in the appended drawing in which.

DETAILED DESCRIPTION

Figure 1:
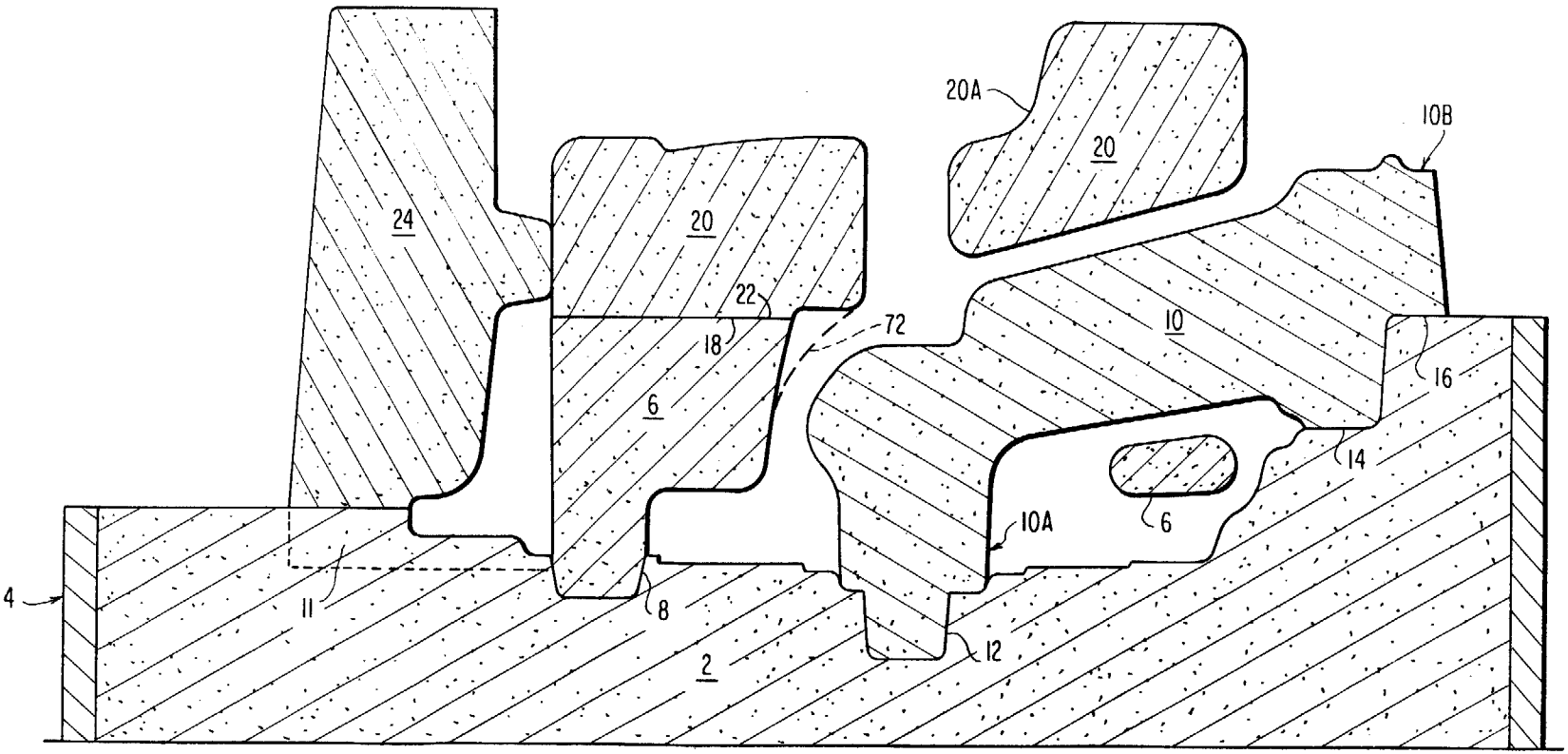
FIG. 1 PRIOR ART
FIG. 1 is a cross-sectional view of a conventional core arrangement for forming a cylinder head of an in-line, six-cylinder internal combustion engine of the overhead valve type.

FIG. 1 illustrates a conventional core arrangement employed in a foundry process for casting a cylinder head of an in-line, six-cylinder internal combustion engine. A base or positioning core 2 is used in which the core assembly is built up. Later the complete assembly will be set into mold section 4. A first core 6 is then inserted into the base core by embedding plurality of core locator portions 8 (only one locator portion 8 being shown in FIG. 1) of the first core 6 firmly within the base core. The base core 2 provides rigid support to retain the first core 6 in a correct position. A second core 10 is then installed by inserting one end 10A thereof through the first core 6 and embedding such end within the base core by means of core locator portions 12 (only one locator portion 12 being shown in FIG. 1). Another end 10B of the second core 10 rests upon surfaces 14 and 16 of the base core 2.

Glue is then applied to a surface 18 of core 6. The third core 20 is placed upon the first core 6 so that the glue-containing surface 18 contacts a surface 22 of the first core 6. When the glue hardens, the first and third cores 6 and 20 are firmly joined together. Thereafter, one or more additional cores 24 are installed around the cores 6, 10, 20. The completed core assembly is set into the drag mold and a cope mold section is installed onto the drag mold section in the usual fashion. When the molten metal is subsequently poured into the mold, the metal occupies the space between the various cores to form suitably configured port walls and jacket walls of the engine head. For instance, the first and third cores 6 and 20 form cooling jacket passages, while the second core 10 forms gas ports.

As noted previously, the use of glue to bond the first and third core sections can produce fins and/or surface imperfections which can diminish or ruin the quality of the cast piece. Also, the cores 6, 10, 20 require a firm base in order to retain their proper posture and spacial relationship within the mold. This is especially evident of first and third cores 6 and 20 which include portions 20A disposed above the second core 10 and yet which are supported by the locating portions 8 situated to one side of the second core 10.

Figure 2:
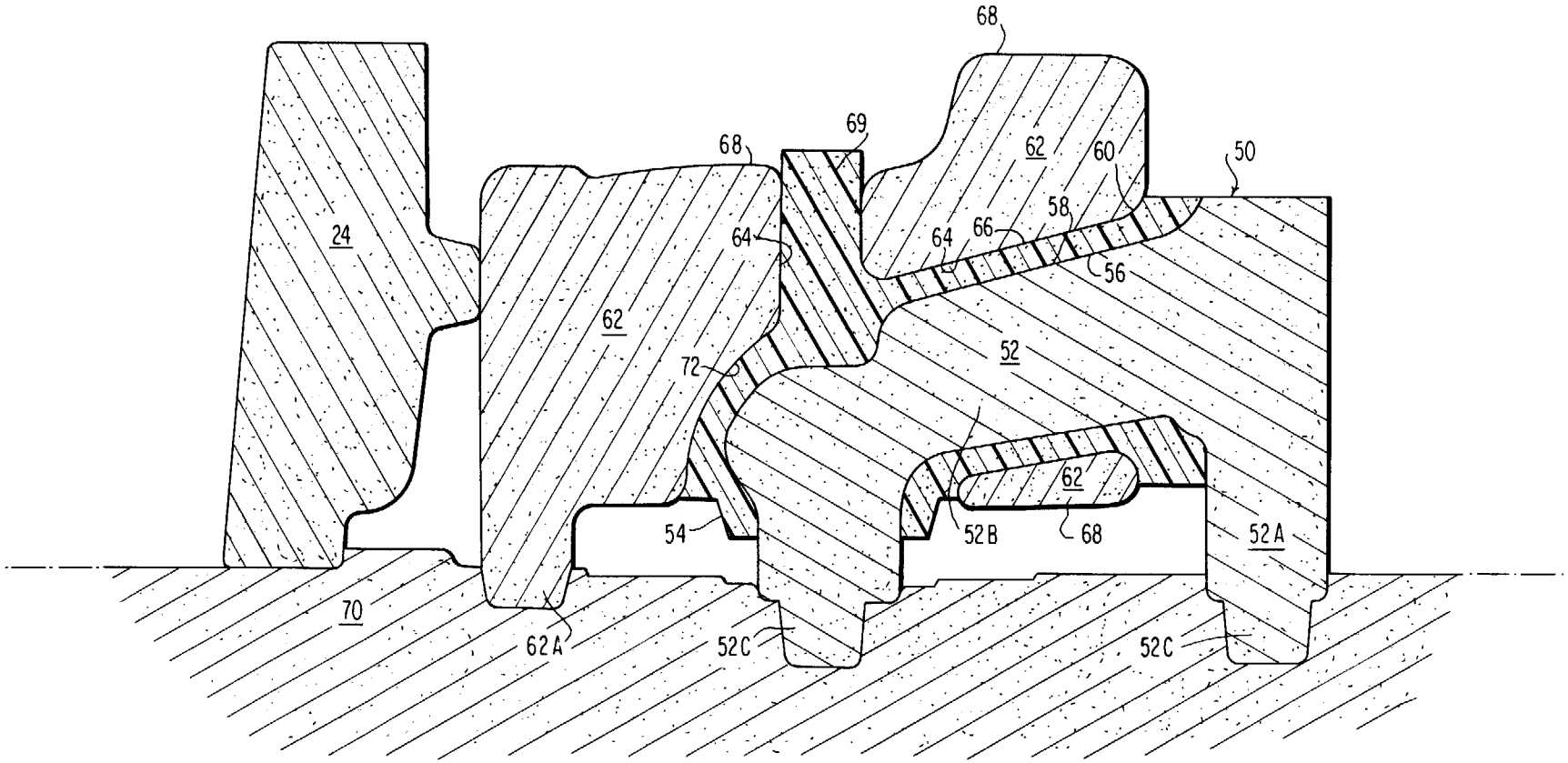
FIG. 2 is a cross-sectional view, similar to that of FIG. 1, depicting a core assembly according to the present invention for use in forming such a cylinder head.
Figure 3:
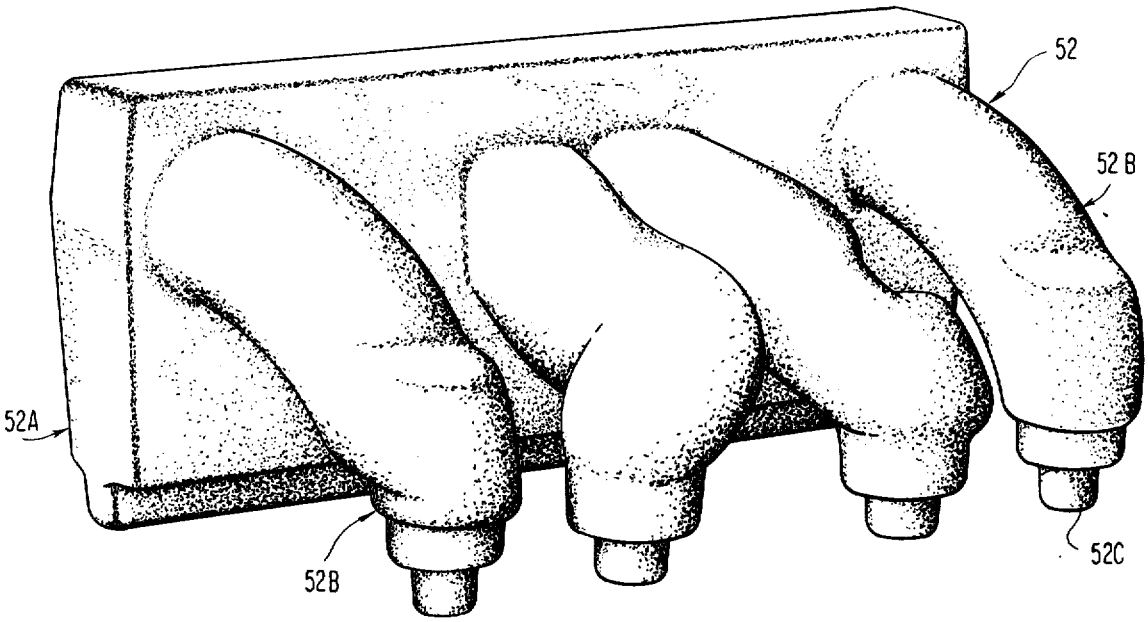
FIGS. 3–5 are perspective views depicting various stages in the fabrication of the core assembly according to the present invention.
Figure 5:
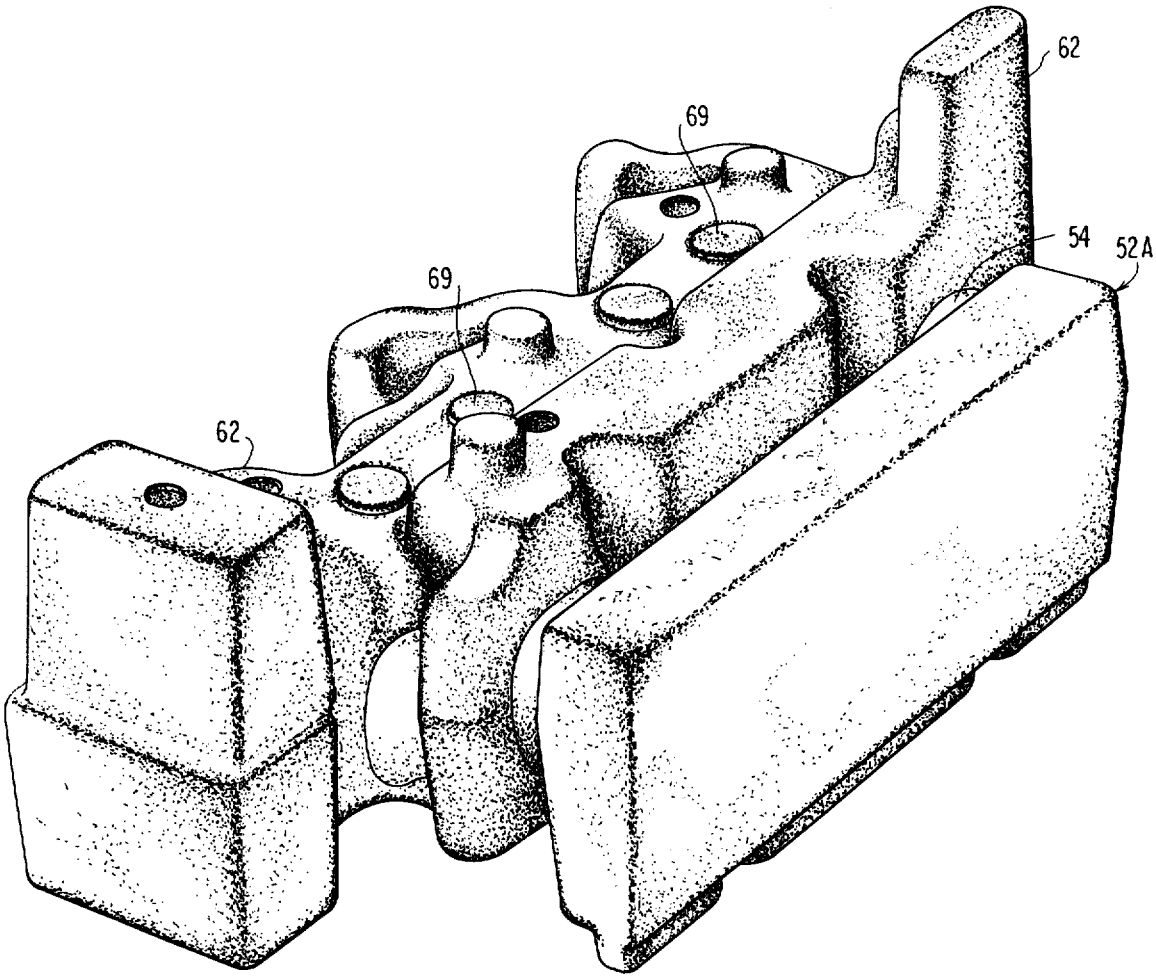

A preferred form of core assembly 50 according to the present invention for dealing with these and other problems is depicted in FIGS. 2 and 5. This core assembly 50 effectively replaces the conventional cores 6, 10 and 20. The core assembly 50 comprises a first, or inner, core 52 (FIGS. 2 and 3) which is configured somewhat like the conventional core 10, with the addition of a base portion 52A for reasons to be explained. The inner core 52 includes port extensions 52B projecting downwardly and laterally from the base portion, and generally coplanar positioning portions 52C at the ends of the base portion and port extensions 52B. Fabrication of the inner core is carried out in any suitable manner. For instance, the inner core can be molded of silica sand and binder such as phenolic base and/or modified phenolic base resin, by conventional techniques.

Figure 4:
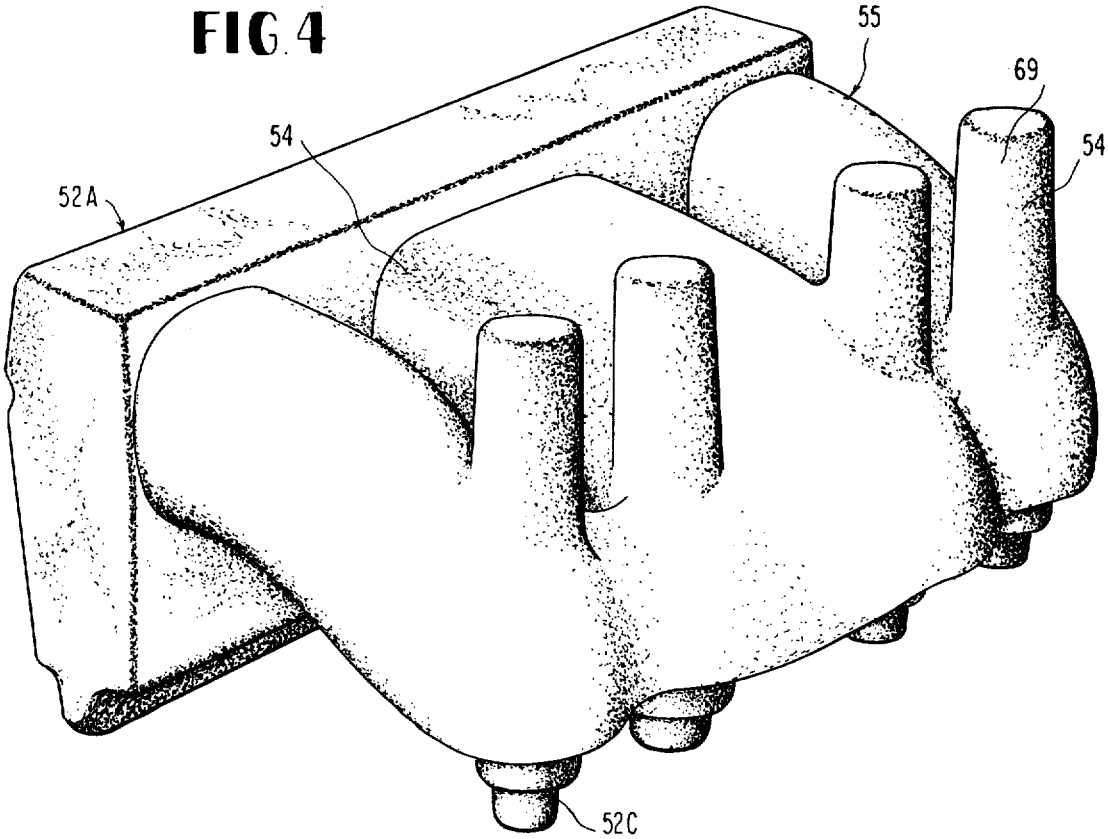

Subsequently, a layer 54 of destructible cellular plastic material is formed around a portion, i.e., the port extension 52B of the inner core 52 (FIG. 4). The destructible cellular plastic material can comprise any suitable low temperature fusible substance, such as a thermoplastic resinous material or any other cellular plastic material which gasifies substantially without residue. Among the materials which have been found satisfactory are polystyrene and resinous polymerized derivatives of methacrylic acid.

Various types of cellular plastic materials suitable for use in casting operations may be found in U.S. Pat. No. 3,374,827, issued to Schebler on Mar. 26, 1968, and U.S. Pat. No. 3,496,989, issued to Paoli on Feb. 24, 1970. For example, to Schebler patent discusses the use of polystyrene and polyurethane as a spacer to be inserted between cemented cores. The Paoli patent discloses the use of polystyrene and polyurethane as a chaplet to abut and position cores in place, and also as a pattern for full mold techniques with a core embedded therein.

The expression "destructible" as applied to the cellular plastic layer 54 is intended to designate materials which are quickly destroyed by the molten metal, thereby enabling the molten material to occupy the space originally occupied by the destructible material. This behavior is contrary to that of a "core" material which might be termed non-destructible in the sense that it is able to resist the effects of the molten metal 50 as to produce a void in the casting.

The destructible layer 54 can be molded in place around the first core 52 by placing the first core 52 into a molding machine. Partially pre-expanded polystyrene pellets can be applied to the mold and fully expanded, via a steam expansion step, or other suitable and accepted method around the first core 52 so as to form a destructible layer whose inner surface 56 intimately contacts and conforms to the configuration of the outer surface 58 of the first core. The outer surface 60 of the molded destructible layer is configured in accordance with the desired shape of the cylinder head.

The plastic layer 54 completely surrounds or encompasses a portion of the first core 52 and, due to the irregular surface configuration of the first core 52, is permanently mounted thereon, i.e., it cannot be removed in any direction.

The first core 52 and the destructible layer 54 form a composite core subassembly 55 which can be handled as a one-piece unit. If required, the composite subassembly can be dried, for example, in a microwave oven to remove any residual water from the steam expansion step. Also, the composite subassembly may be dipped into a solution of protective surface coating to provide a better casting finish for the ultimate metal casting.

Thereafter, a second or outer core 62, which constitutes a cooling jacket core in the preferred embodiment, is formed around a portion of the composite subassembly 55 so as to intimately contact and conform to the configuration thereof (FIGS. 2 and 5). This can be accomplished by placing the subassembly 55 into a second corebox and core blower and blowing a suitable core composition, such as silica sand and binder, therearound. The outer core 62 is thus blown in place in overlying relation to a portion of the destructible layer 54 to encompass or surround the latter. An inner surface 64 of the outer core 62 intimately contacts and conforms to the configuration of the outer surface 66 of the destructible layer 54. The outer surface 68 of the outer core 62 is configured in accordance with the desired ultimate shape of the cooling jacket passage. Portions of the cooling jacket passages are formed by molding the outer core around solid upright post portions 69 of the destructible layer forming the valve guide bosses of the cylinder head. The outer core 62 also includes integral positioning parts 62A.

Due to the irregular configuration of the subassembly 55, the outer core 62 is permanently secured thereto. That is, the outer core 62 cannot be removed in any direction.

The inner core 52, together with the molded-in-place plastic layer 54 and the molded-in-place outer core 62 form a final core assembly 50 which can be substituted for the conventional cores 6, 10 and 20. This assembly 50 can be inserted directly into a pre-formed cavity in the green sand 70 of the drag half of the mold without the need for a positioning core 2. This results in part from the fact that core locating portions 52C, 62A of the cores 52, 62 are part of a composite assembly and now function to support the core assembly 50 as a whole, rather than only individual cores as was previously the case. The core assembly 50 thus includes positioning portions that are spaced in two directions and is more stable within the mold than are the individual cores of the conventional technique. Therefore, adequate support can be provided by the green sand of the mold in the absence of a base core. By eliminating the need for base cores, the time and materials required for their fabrication and handling are saved. The end 52A of the inner core 52 is formed so as to engage the green sand 50 to provide support for one side of the core assembly 50 in the absence of the shoulders 14, 16 of the base core.

Alignment and installation of the core assembly 50 in the drag portion is greatly simplified since it can be inserted in one piece and no gluing is required. Subsequently, conventional cores such as 24 can be installed around the core assembly 50.

A cope portion of the mold is then positioned over the drag portion, whereafter a molten iron charge is poured into the mold cavity to form the cylinder head. The destructible expanded cellular plastic layer 54 is gasified and replaced by the molten metal as it enters the mold. The vapors of the plastic layer can be allowed to escape from the mold through suitable vent holes.

The metal forms port and jacket walls of the cylinder head in accordance with the configuration of the outer surface 58 of the inner and outer cores 52, 62.

Since the present invention eliminates the need for gluing cores, the expense involved in such procedure is obviated. Also, the creation of fins, pitting and other imperfections associated with gluing is avoided.

Moreover, it has been found that the present invention enables the cylinder head to be advantageously redesigned. This is, a wall portion 72 of the core assembly (FIG. 2) can be configured in accordance with optimum jacket passage design, rather than in accordance with the need for assembly clearance for another core, such as core 10 in the conventional technique (see FIG. 1). The new location of the wall portion 72 made possible by the present invention is depicted in broken lines in FIG. 1 for purposes of comparison. It will be realized that the port wall in this region is rendered thinner and more uniform than before, resulting in the use of less metal in the casting and better heat dissipation.

Although the present invention has been described above with reference to a composite assembly of two cores and an intermediate layer of expanded cellular plastic material, it will be understood by those skilled in the art that the coring assembly may include three or more cores, each core being formed onto and spaced from the next inner core by a layer of cellular plastic material. Thus, for example, another layer of cellular plastic material, if desired, could be formed around the surface of core 62 and another core molded around that plastic surface. The composite assembly may thus contain any number of layers of cores and plastic as deemed feasible.

It will also be understood that the present invention is applicable for the production of any kind of metal casting. While it has been described above with reference to the casting of a cylinder head, and appears to be especially useful in this area, due to the intricity of the core assemblies needed for the casting, the present invention may be utilized for the production of other types of castings using any metal.

The invention is additionally illustrated in connection with the following Example which is to be considered as illustrative of the present invention. It should be understood, however, that the invention is not limited to the specific detail of the Example.

EXAMPLE

A first core 52 is formed in a mold or corebox from silica sand and a phenolic base and/or modified phenolic base resin binder compound. The first core 52 is then placed into a mold or corebox which is thereafter filled with partially expanded polystyrene pellets. Steam is applied to this mold to fully expand the pellets to form a destructible layer 54 therearound in intimate contact with the first core 52. The composite core subassembly defined by the first core and the destructible plastic layer is dried in a microwave oven until residual water from the stem expansion step is evaporated. Then the subassembly is dipped into a protective surface coating to perfect the casting finish.

The subassembly is thereafter placed into another mold or corebox which is filled with silica sand and phenolicisocyanate binder activated by a triethylamine or dimethylethylamine catalysis to form a second core 62 around the destructible layer of the subassembly in intimate contact therewith.

The resulting [sub assembly ] *assembly* is then placed in the drag portion of a mold assembly containing foundry sand and other conventional core assembly components are placed about the [sub assembly ] *assembly* to form a composite mold assembly suitable for forming a casting of a cylinder head for a six cylinder engine. The cope portion of the mold assembly is combined with the drag portion in a conventional manner. A casting is made using this composite mold assembly using conventional techniques. The interior of resulting casting is smooth-surfaced, free of pits and fins and is suitable for use as a cylinder head.

I claim:

1. A method of casting metal castings comprising the steps of:

forming a composite core assembly by:

fabricating a first core having an irregular outer surface portion;

molding a destructible layer of cellular plastic material around said irregular outer surface portion of said first core, such that an inner surface of said layer intimately contacts and conforms to the configuration of said irregular outer surface portion of said first core to interlock said first core and said plastic layer together, and such that the outer surface of said plastic layer includes an irregular surface portion; and molding a second core in encompassing relation around said irregular outer surface portion of said plastic layer, such that an inner surface of said second core intimately contacts and conforms to the configuration of the irregular outer surface portion of said plastic layer to interlock said second core and said plastic layer together, and such that the outer surface of said second core is of nonconforming shape relative to the outer surface of said plastic layer;

forming a mold cavity within a pair of mold halves; inserting said core assembly as an integral unit within one of said mold halves;

securing said mold halves together; and introducing molten metal into said cavity to destroy said plastic layer and form said casting.

2. A method according to claim 1 wherein said step of molding a destructible layer comprises inserting said first core into a corebox, applying thermoplastic resinous pellets around said first core and expanding said pellets around said first core.

3. A method according to claim 2 wherein said step of applying resinous pellets comprises applying pre-expanded polystyrene pellets.

4. A method of forming a core assembly comprising the steps of:

fabricating a first core having an irregular outer surface portion;

inserting said first core in to a first mold and molding a destructible layer of cellular plastic material in encompassing relation around said irregular outer surface portion of said first core such that an inner surface of said plastic layer intimately contacts and conforms to the configuration of said irregular outer surface portion of said first core to interlock said first core and said plastic layer together, and such that the outer surface of said plastic layer includes an irregular surface portion; and inserting as a unit said first core and said molded plastic layer into a second corebox having a cavity which defines a surface of nonconforming shape relative to the outer surface of said plastic layer, and molding a second core in encompassing relation around said irregular outer surface portion of said plastic layer such that an inner surface of said second core intimately contacts and conforms to the configuration of the irregular outer surface portion of said plastic layer to interlock said second core and said plastic layer together.

5. A method according to claim 4 wherein said step of molding a destructible layer comprises inserting said first core into a corebox, applying thermoplastic resinous pellets around said first core and expanding said pellets around said first core.

6. A method according to claim 5 wherein said step of applying resinous pellets comprises applying pre-expanded polystyrene pellets.

7. A coring assembly for use in casting a cylinder head for an internal combustion engine, comprising:

a port core having a base and port-defining extensions projecting generally laterally and downwardly from said base in generally parallel relationship;

said port-defining extensions having irregular outer surface portions;

said base and port-defining extensions terminating downwardly in essentially coplanar positioning members;

a molded-in-place destructible layer of cellular plastic material disposed in encompassing relation around a substantial portion of said port-defining extensions of said port core; said plastic layer including a plurality of spaced upstanding posts for forming cast-in-place valve guide bosses of the engine and forming an irregular outer surface portion of said plastic layer;

said plastic layer including an inner surface which intimately contacts and conforms to the irregular outer surface portion of said port core to interlock said port core and said plastic layer together;

a molded-in-place cooling jacket core disposed in encompassing relation around a substantial portion of said plastic layer including said upstanding posts;

said cooling jacket core terminating downwardly in a positioning portion and including an inner surface which intimately contacts and conforms to the irregular outer surface portion of said plastic layer to interlock said cooling jacket core and said plastic layer together, the outer surface of said cooling jacket core being of nonconforming shape relative to the outer surface of said plastic layer.

8. A core assembly according to claim 7 wherein said destructible layer comprises a thermoplastic resinous material.

9. A core assembly according to claim 8 wherein said thermoplastic resinous material is polystyrene.

*10. A method of casting metal castings comprising the steps of:*

*fabricating a composite core assembly by*

*molding a destructible layer of cellular plastic material such that a surface of said plastic layer includes an irregular surface portion; and*

*forming a core in encompassing relation around said irregular surface portion of said plastic layer by blowing a mixture of sand and binder around said surface portion, such that a surface of said core intimately contacts and conforms to the configuration of the irregular surface portion of said plastic layer to interlock said core and said plastic layer together;*

*forming a mold cavity within a pair of mold sections;*

*inserting said core assembly as an integral unit within one of said mold sections;*

*securing said mold sections together; and*

*introducing molten metal into said cavity to destroy said plastic layer and form said casting.*

*11. A method according to claim 10, wherein said step of molding a plastic layer comprises fabricating an initial core having an irregular surface portion, inserting said initial core into a corebox, applying thermoplastic resinous pellets around said initial core, and expanding said pellets around said initial core such that a surface of said plastic layer intimately contacts and conforms to said irregular surface portion of said initial core.*

*12. A method according to claim 11, wherein said step of applying resinous pellets comprises applying pre-expanded polystyrene pellets.*

*13. A core assembly for use in metal casting operations, comprising:*

*a first core having an irregular outer surface,*

*a mold-in-place, destructible layer of plastic cellular material disposed around at least a portion of said outer surface of said first core, with an inner surface of said plastic layer intimately contacting and conforming to the irregular configuration of said first core to interlock said first core and plastic layer such that removal of said plastic layer from said first core in any direction is prevented;*

*said first core and said plastic layer forming a composite core subassembly; and*

*a formed-in-place second core encompassing a portion but not all of said subassembly in overlying relation to said plastic layer and in non-engagement with said first core;*

*an inner surface of said second core intimately contacting and conforming to an irregular surface portion of said plastic layer to interlock said second core and said plastic layer.*

*14. A core assembly according to claim 13, wherein said second core comprises sand and binder.*

*15. A core assembly according to claim 13, wherein said plastic layer comprises a thermoplastic resinous layer.*

*16. A core assembly according to claim 15, wherein said resinous material is polystyrene.*

* * * * *